(12) United States Patent
Komoda

(10) Patent No.: US 11,604,507 B2
(45) Date of Patent: Mar. 14, 2023

(54) INFORMATION PROCESSING METHOD, NON-TRANSITORY RECORDING MEDIUM, AND INFORMATION PROCESSING APPARATUS

(71) Applicant: JINS HOLDINGS Inc., Gunma (JP)

(72) Inventor: Taiki Komoda, Gunma (JP)

(73) Assignee: JINS HOLDINGS Inc., Gunma (JP)

( * ) Notice: Subject to any disclaimer, the term of this patent is extended or adjusted under 35 U.S.C. 154(b) by 0 days.

(21) Appl. No.: 17/388,272

(22) Filed: Jul. 29, 2021

(65) Prior Publication Data

US 2022/0035448 A1 Feb. 3, 2022

(30) Foreign Application Priority Data

Jul. 30, 2020 (JP) .............................. JP2020-129625

(51) Int. Cl.
*G06F 3/01* (2006.01)
*G06F 3/0346* (2013.01)
*G02B 27/01* (2006.01)

(52) U.S. Cl.
CPC ........... *G06F 3/012* (2013.01); *G02B 27/017* (2013.01); *G02B 27/0179* (2013.01); *G06F 3/0346* (2013.01); *G02B 2027/014* (2013.01); *G02B 2027/0178* (2013.01); *G02B 2027/0187* (2013.01)

(58) Field of Classification Search
CPC ..... G06F 3/012; G06F 3/0346; G02B 27/017; G02B 27/0179; G02B 2027/0187
See application file for complete search history.

(56) References Cited

U.S. PATENT DOCUMENTS

| 8,947,323 B1* | 2/2015 | Raffle ................ G02B 27/0093 345/157 |
| 9,035,878 B1* | 5/2015 | Wheeler ............... G06F 3/0485 345/157 |
| 9,378,592 B2* | 6/2016 | Kim ........................ G06F 3/017 |
| 9,433,369 B2* | 9/2016 | Kanoh ................. A61B 5/6803 |
| (Continued) | | |

FOREIGN PATENT DOCUMENTS

| JP | H04309996 A | 11/1992 |
| JP | H09258887 A | 10/1997 |

*Primary Examiner* — Benyam Ketema
(74) *Attorney, Agent, or Firm* — Sterne, Kessler, Goldstein & Fox P.L.L.C.

(57) ABSTRACT

Appropriately separating at least two different types of processing by using a motion of a predetermined part provided with a sensor. An information processing method executed by a processor included in an information processing apparatus, the information processing method comprising: sequentially acquiring data relating to a movement speed of a predetermined part of a user from a sensor mounted on the predetermined part; determining whether or not the data is equal to or higher than a predetermined threshold; controlling, when the data is determined to be lower than the predetermined threshold, execution of first processing by using data preceding, by a first predetermined amount of time, a time point where the determination is made that the data is lower than the predetermined threshold; and controlling, when the data is determined to be equal to or higher than the predetermined threshold, execution of second processing that differs from the first processing.

8 Claims, 7 Drawing Sheets

(56) References Cited

U.S. PATENT DOCUMENTS

| | | | |
|---|---|---|---|
| 10,602,953 B2* | 3/2020 | Komaki | A61B 5/6803 |
| 2004/0070729 A1* | 4/2004 | Wiebe | G06F 3/015 |
| | | | 351/209 |
| 2008/0013041 A1* | 1/2008 | Chou | G02C 11/06 |
| | | | 351/158 |
| 2010/0141577 A1* | 6/2010 | Moritaku | G06F 3/0383 |
| | | | 345/157 |
| 2011/0170067 A1* | 7/2011 | Sato | A61B 5/7445 |
| | | | 345/157 |
| 2011/0178784 A1* | 7/2011 | Sato | A61B 3/107 |
| | | | 703/2 |
| 2012/0092609 A1* | 4/2012 | Rothstein | G02C 1/08 |
| | | | 351/95 |
| 2013/0324881 A1* | 12/2013 | Kanoh | A61B 5/6803 |
| | | | 600/547 |
| 2014/0078176 A1* | 3/2014 | Kim | G06T 19/006 |
| | | | 345/633 |
| 2014/0228652 A1* | 8/2014 | Terada | A61B 5/291 |
| | | | 600/383 |
| 2015/0238108 A1* | 8/2015 | Kanoh | A61B 5/398 |
| | | | 600/383 |
| 2016/0132107 A1* | 5/2016 | Kanishima | G06F 3/015 |
| | | | 351/158 |
| 2017/0185159 A1* | 6/2017 | Murase | G06F 3/041 |
| 2017/0322622 A1* | 11/2017 | Hong | G06F 3/041 |
| 2018/0049664 A1* | 2/2018 | Miyazaki | G02C 5/22 |
| 2018/0064371 A1* | 3/2018 | Yamada | A61B 5/1116 |
| 2018/0070812 A1* | 3/2018 | Miyazaki | G02C 11/00 |
| 2018/0196505 A1* | 7/2018 | Nishizawa | G06F 3/013 |
| 2018/0217590 A1* | 8/2018 | Kobayashi | G05D 1/0038 |
| 2018/0249086 A1* | 8/2018 | Ozawa | H04N 7/185 |
| 2019/0146222 A1* | 5/2019 | Hiroi | G06F 3/012 |
| | | | 345/8 |
| 2020/0225830 A1* | 7/2020 | Tang | G06F 3/0482 |
| 2021/0294482 A1* | 9/2021 | Ikeda | G06V 40/28 |

* cited by examiner

Fig. 4

| TIME POINT | MOVEMENT SPEED DATA | ... |
|---|---|---|
| 1 | d_1 | ... |
| 2 | d_2 | ... |
| 3 | d_3 | ... |
| ... | ... | ... |
| 56 | d_56 | ... |
| ... | ... | ... |
| 59 | d_59 | ... |
| 60 | d_60 | ... |
| ... | ... | ... |

Fig. 6

| DETERMINATION TIME POINT | PROCESSING EXECUTED | TIME POINT OF DATA USED |
|---|---|---|
| ... | ... | ... |
| 0.75 | FIRST PROCESSING | 0.70 |
| 0.80 | FIRST PROCESSING | 0.75 |
| 0.85 | SECOND PROCESSING | N/A |
| 0.90 | N/A | N/A |
| ... | ... | ... |
| 1.25 | N/A | N/A |
| 1.30 | FIRST PROCESSING | 1.25 |
| 1.35 | FIRST PROCESSING | 1.30 |
| ... | ... | ... |

INFORMATION PROCESSING METHOD, NON-TRANSITORY RECORDING MEDIUM, AND INFORMATION PROCESSING APPARATUS

BACKGROUND

Field

The present invention relates to an information processing method, a non-transitory recording medium, and an information processing apparatus.

Description of Related Art

Conventionally, there are known techniques for controlling input operations, such as a click operation, on input means, such as a mouse, by using a sensor that detects a motion of the head of a user (for example refer to Patent Publication JP-A-H4-309996 and Patent Publication JP-A-H9-258887).

SUMMARY

However, with the conventional techniques, it is difficult to appropriately separate two different operations by using a motion of the head. For example, when separating a moving operation by a mouse pointer inside a screen and another operation, which is, for example, a click operation, it is difficult for a user to instruct the click operation at a predetermined position by moving the user's head to align a pointer at the predetermined position and then moving the head to perform the click operation, because the motion of the head, until the motion is determined to be a click operation, is used as a moving operation and, therefore, the position of the pointer ends up being shifted from the predetermined position.

In consideration thereof, an object of the disclosed technique is to appropriately separate at least two different types of processing by using a motion of a predetermined part provided with a sensor.

An information processing method according to an aspect of the disclosed technique to be executed by a processor included in an information processing apparatus, the information processing method comprising: sequentially acquiring data relating to a movement speed of a predetermined part of a user from a sensor mounted on the predetermined part; determining whether or not the data is equal to or higher than a predetermined threshold; controlling, when the data is determined to be lower than the predetermined threshold, execution of first processing by using data preceding, by a first predetermined amount of time, a time point (a point in time) where the determination is made that the data is lower than the predetermined threshold; and controlling, when the data is determined to be equal to or higher than the predetermined threshold, execution of second processing that differs from the first processing.

According to the disclosed technique, at least two different types of processing can be appropriately separated using a motion of a predetermined part provided with a sensor.

BRIEF DESCRIPTION OF DRAWINGS

FIG. 4 is a diagram showing an example of data related to a movement speed according to the example;

FIG. 6 is a diagram showing a relationship among a determination time point, processing to be executed, and a time point of data used of a specific example in the example.

DETAILED DESCRIPTION

Figure 1:
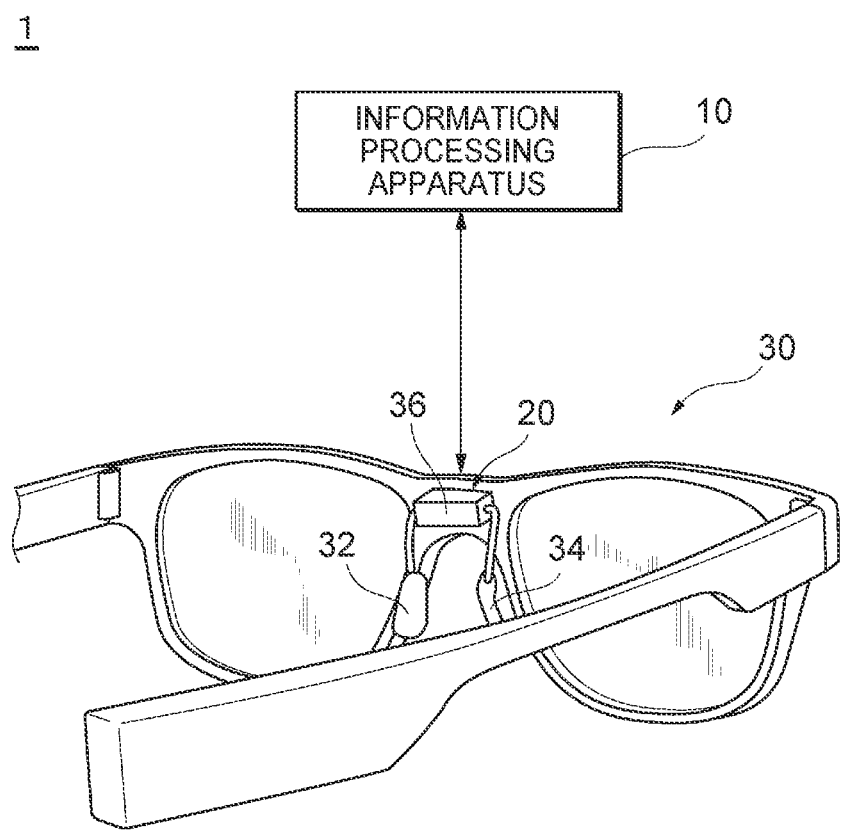
FIG. 1 is a diagram showing an example of an information processing system according to an example.

Hereinafter, an embodiment of the present invention will be described with reference to the drawings. However, the embodiment described below is merely exemplary in nature and is not intended to exclude various modifications and applications of techniques not explicitly described below. In other words, the present invention can be implemented in various modifications without departing from the spirit and the scope of the invention. In addition, in the description of the drawings provided below, same or similar portions are expressed by assigning same or similar reference characters. The drawings are schematic in nature and are not necessarily consistent with actual dimensions, ratios, and the like. The drawings may also contain portions of which a dimensional relationship or a ratio differs among the drawings.

Example

While eyewear is described as an example of an object of a wearable terminal that is mounted with an acceleration sensor and/or an angular velocity sensor and, if necessary, a bioelectrode, the object of a wearable terminal is not limited thereto. FIG. 1 is a diagram showing an example of an information processing system 1 according to the example. The information processing system 1 shown in FIG. 1 includes an information processing apparatus 10 and eyewear 30, and the information processing apparatus 10 and the eyewear 30 are connected to each other via a network so as to be capable of data communication.

The eyewear 30 is mounted with a processing apparatus 20 in, for example, a bridge portion thereof. The processing apparatus 20 includes a pair of nose pads and a bridge part which respectively have bioelectrodes 32, 34, and 36. The processing apparatus 20 may include a three-axis acceleration sensor and/or a three-axis angular velocity sensor (which may be a six-axis sensor). It should be noted that the bioelectrodes 32, 34, and 36 are not necessarily essential.

The processing apparatus 20 detects a sensor signal, an ocular potential signal, or the like and transmits the signal to the information processing apparatus 10. An installation position of the processing apparatus 20 does not necessarily have to be the bridge portion and the processing apparatus 20 need only be positioned so that a sensor signal or an ocular potential signal can be acquired when the eyewear 30 is worn. Alternatively, the processing apparatus 20 may be attachably and detachably provided in the bridge portion.

The information processing apparatus 10 is an information processing apparatus having a communication function. For example, the information processing apparatus 10 is a personal computer, a tablet terminal, a mobile terminal, or the like. The information processing apparatus 10 acquires data related to a movement of the head of a user received from the processing apparatus 20 and executes a plurality of types of operation processing based on the data. Examples of the types of operation processing include a cursor movement, a click, a drag, and a scroll. In addition, the information processing apparatus 10 may receive a command for instructing operation processing from the processing apparatus 20.

Configuration of Information Processing Apparatus 10

Figure 2:
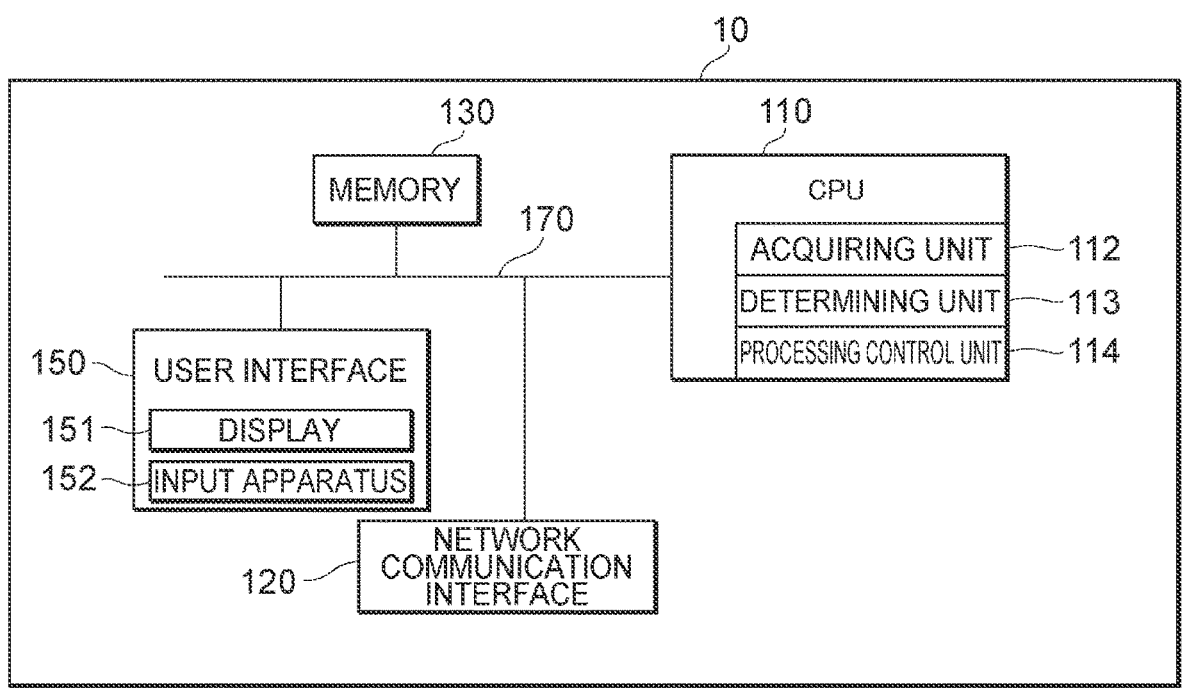
FIG. 2 is a block diagram showing an example of a configuration of an information processing apparatus according to the example.

FIG. 2 is a block diagram showing an example of a configuration of the information processing apparatus 10 according to the example. The information processing apparatus 10 includes one or a plurality of processing apparatuses (CPU) 110, one or a plurality of network communication interfaces 120, a memory 130, a user interface 150, and one or a plurality of communication buses 170 for connecting these components to each other.

The network communication interface 120 is connected to a network via a mobile communication antenna or a wireless LAN communication antenna and is capable of performing data communication with the processing apparatus 20.

Examples of the user interface 150 include a display apparatus and an input apparatus (a keyboard and/or a mouse or some other kind of pointing device). The user interface 150 is capable of performing a moving operation of a pointer displayed on the display apparatus.

For example, the memory 130 may be a high-speed random access memory such as a DRAM, an SRAM, or other random-access solid-state storage apparatuses, one or a plurality of magnetic disk storage apparatuses, optical disk storage apparatuses, a nonvolatile memory such as a flash memory device or other nonvolatile solid-state storage apparatuses, or a computer-readable non-transitory recording medium.

The memory 130 stores data to be used by the information processing system 1. For example, the memory 130 stores data transmitted from the eyewear 30 (the processing apparatus 20). An example of data to be stored will be described later with reference to FIG. 4.

In addition, as another example of the memory 130, the memory 130 may be constituted by one or a plurality of storage apparatuses installed at a remote location from the CPU 110. In a given embodiment, the memory 130 stores a program, a module and a data structure, or subsets thereof to be executed by the CPU 110.

The CPU 110 constitutes an acquiring unit 112, a determining unit 113, and a processing control unit 114 by executing a program stored in the memory 130.

The acquiring unit 112 sequentially acquires data related to a movement speed of a predetermined part of the user from a sensor mounted to the predetermined part. For example, the acquiring unit 112 sequentially acquires, via the network communication interface 120, angular velocity data transmitted from the processing apparatus 20 including an angular velocity sensor that samples angular velocity at a predetermined sampling rate. Acquiring data from a sensor includes directly or indirectly acquiring data. While the predetermined part in the example is the head, alternatively, the predetermined part may be an arm or a leg. The sensor is a sensor capable of measuring a movement speed of the predetermined part and, in the example, the sensor is preferably an angular velocity sensor or an acceleration sensor.

The determining unit 113 determines whether or not data acquired by the acquiring unit 112 is equal to or higher than a predetermined threshold. For example, the determining unit 113 determines whether or not a data value of sequentially-acquired angular velocity data is equal to or higher than the predetermined threshold. A threshold that enables a sudden motion to be detected is set as the predetermined threshold in advance. For example, when the predetermined part is the head, a threshold that is exceeded when the head is quickly shaken in a horizontal direction or a vertical direction is set and, when the predetermined part is an arm or a leg, a threshold that is exceeded when the arm or the leg moved is quickly is set.

The processing control unit 114 controls execution of at least two types of processing, namely, first processing and second processing. The control of execution of processing may include both issuing a command that instructs the processing to be executed and executing the processing itself.

When the determining unit 113 determines that data is lower than the predetermined threshold, the processing control unit 114 controls execution of the first processing by using data preceding, by a first predetermined amount of time, a time point where the determination is made that the piece of data is lower than the predetermined threshold (hereinafter, referred to as a "threshold-exceeded determination time point"). The first processing includes, for example, processing accompanying a movement of a pointer inside a screen.

When the determining unit 113 determines that data is equal to or higher than the predetermined threshold, the processing control unit 114 controls execution of the second processing that differs from the first processing. The second processing includes, for example, processing for issuing an instruction at a predetermined position.

Let us now consider, as an example, a case where the first processing is movement processing of a pointer inside a screen, the second processing is instruction processing at a predetermined position, and the user moves the pointer by moving the head at an angular velocity that is lower than a threshold and, once the user determines that the pointer has arrived at the predetermined position, the user executes the instruction processing by moving the head at an angular velocity that is equal to or higher than the threshold. According to this example, since the angular velocity of the head requires a rise time to reach the threshold, a time point where the user determines that the pointer has arrived at the predetermined position and a time point where the angular velocity of the head becomes equal to or higher than the threshold do not match each other. Therefore, if the first processing is to be executed by sequentially using, in real-time, pieces of data that represent the angular velocity of the head being lower than the threshold among the acquired pieces of data, since even data during the rise time ends up being used in the movement processing, the instruction processing ends up being executed at a position that is shifted from the predetermined position.

Therefore, in data based on a series of motions of the predetermined part to equal or exceed the predetermined threshold, data of a rise portion until the predetermined threshold is equaled or exceeded is prevented from being used in the first processing. To this end, the processing control unit 114 is configured to use data preceding, by a first predetermined amount of time, the threshold-exceeded determination time point in the first processing. The first predetermined amount of time is desirably set to a numerical value between, for example, 0.05 seconds to 0.2 seconds in order to reduce a time lag between a motion of the user and a motion of the pointer. The first predetermined amount of time may be set based on a sampling rate of the sensor of the processing apparatus 20. For example, when the sampling rate is 0.05 seconds, the first predetermined amount of time may be set in units of 0.05 seconds.

Accordingly, by executing the first processing using data of the first predetermined amount of time before and executing the second processing once the data equals or exceeds the predetermined threshold, the first processing and the second processing can be appropriately separated from each other. For example, when the first processing is processing accompanying a movement of the pointer, the processing can be executed in a preferable manner.

In addition, when controlling the execution of the first processing, the processing control unit 114 may include not using data within a second predetermined amount of time of a time point where the determination that data is equal to or higher than the predetermined threshold is made in order to prevent data based on a series of motions of the predetermined part for instructing the second processing from being used. For example, as the second predetermined amount of time, a numerical value such as 0.4 seconds or 0.5 seconds that is an average amount of time or the like of a series of motions of the predetermined part to equal or exceed the predetermined threshold can be set. For example, the processing control unit 114 may prohibit the use of acquired data for movement processing or suspend data acquisition itself until the second predetermined amount of time elapses from the threshold-exceeded determination time point. Alternatively, for the second predetermined amount of time, a time point of the first predetermined amount of time before the time point where the determination that the data is equal to or higher than the predetermined threshold is made may be adopted as a time point to start countdown.

Accordingly, use of data based on a series of motions of the predetermined part for instructing the second processing for executing the first processing can be avoided and the first processing and the second processing can be more appropriately separated from each other.

Alternatively, the second predetermined amount of time may be set based on the time until data is determined to be lower than the predetermined threshold. For example, the determining unit 113 determines whether or not data having once equaled or exceeded the predetermined threshold becomes lower than the predetermined threshold. When the determining unit 113 determines that the data is lower than the predetermined threshold, the processing control unit 114 controls execution of the first processing using the data.

Accordingly, when the data enters a range of data (lower than the predetermined threshold) to be used to execute the first processing, a transition to the execution of the first processing can be quickly made.

In addition, when controlling the execution of the first processing, the processing control unit 114 may set a timer based on the time point where the determination that data is equal to or higher than the predetermined threshold is made. In this case, the processing control unit 114 may include adopting an amount of time until the timer expires without data being determined to be equal to or higher than the predetermined threshold while the timer elapses as the second predetermined amount of time and not using data within the second predetermined amount of time. For example, the timer may be reset when data equals or exceeds the threshold while the timer elapses. It should be noted that a countdown of the timer may start at a time point of the first predetermined amount of time before the time point where the determination that the data is equal to or higher than the predetermined threshold is made.

Accordingly, a no-use zone of data can be determined using the timer and, further, when data once again equals or exceeds the threshold while the timer elapses, the timer can also be reset.

In addition, when data related to a movement speed includes pieces of data related to a movement speed in a plurality of directions including a first direction, the determining unit 113 may include determining whether or not the piece of data in the first direction is equal to or higher than the predetermined threshold. In this case, the processing control unit 114 may include not using pieces of data in the first direction and other directions within the second predetermined amount of time for the execution of the first processing. For example, when the sensor is a three-axis angular velocity sensor, the data is data of an angular velocity vector that includes direction. As a specific example, when the first direction is a rightward direction, although the second processing is executed when the user quickly moves the predetermined part in the rightward direction, data corresponding to a motion of the predetermined part in a direction other than the rightward direction is not to be used for the first processing within the second predetermined amount of time.

Accordingly, when data is data with directionality and the second processing is executed based on a movement in the first direction, the first processing can be prevented from being executed by a movement in other directions. For example, the first processing can be prevented from being executed by an unintentional motion of the user immediately following a motion of the user for instructing the execution of the second processing.

In addition, when it is determined that data is equal to or higher than the predetermined threshold, the processing control unit 114 may include switching from the execution of the first processing to the execution of the second processing and controlling the execution of the second processing. In this case, the determining unit 113 may determine whether or not a termination condition for returning to the execution of the first processing is satisfied. When the termination condition is satisfied, the processing control unit 114 switches from the execution of the second processing to the execution of the first processing and controls the execution of the first processing. For example, the termination condition includes at least one of an elapse of the second predetermined amount of time from the time point where data is determined to be equal to or higher than the predetermined threshold and the data becoming equal to or lower than the predetermined threshold.

Accordingly, the processing control unit 114 can reliably separate two types of processing by changing control entities.

In addition, the first processing may include movement processing of a pointer within a display screen of the information processing apparatus 10 and the second processing may include click processing or drag processing. For example, let us assume that the first processing is movement processing of a mouse cursor that is an example of a pointer and the second processing is click processing of the mouse. In this case, when the mouse cursor moves within the screen in response to a normal motion of the head (an example of the predetermined part) of the user and click processing is executed by a quick motion of the head, the mouse cursor can be prevented from being moved by an initial motion (a motion of which data related to a movement speed is lower than the predetermined threshold) among a series of quick motions and the click processing can be executed at a predetermined position.

Furthermore, let us assume that the first processing is movement processing of a mouse cursor that is an example of a pointer and the second processing is drag processing of the mouse. In this case, when the mouse cursor moves within the screen in response to a normal motion of the head (an example of the predetermined part) of the user and drag processing is executed by a quick motion of the head, the mouse cursor can be prevented from being moved (from deviating from a position of an icon or the like desired by the user) by an initial motion (a motion of which data related to a movement speed is lower than the predetermined threshold) among a series of quick motions and the drag processing can be executed by appropriately instructing the icon or the like at a predetermined position.

In this case, when the data becomes equal to or higher than the predetermined threshold and the drag processing is executed, the processing control unit 114 controls execution of movement processing of the drag based on data after the predetermined threshold is equaled or exceeded. In addition, the processing control unit 114 may control execution of the first processing by setting a termination condition of the drag processing. The termination condition in this case includes, for example, data becoming equal to or higher than the predetermined threshold.

In addition, while angular velocity data and acceleration data can be applied as data related to a movement speed, the processing control unit 114 may be configured to control execution of two or more types of processing by including data indicating directionality. For example, the processing control unit 114 associates, in advance, a quick motion of the head in a leftward direction with a left click, a quick motion in the rightward direction with a right click, a quick motion in a downward direction with a start of a drag (a state in which a click button is being continuously depressed over a movement target object (for example, an icon on the desktop) during a normal mouse operation), and a quick motion in an upward direction with a release of a drag (a state where depression of the click button is stopped during the normal mouse operation). Accordingly, the processing control unit 114 is capable of changing the type of processing to be controlled in accordance with a direction in which data related to a movement speed becomes equal to or exceeds the predetermined threshold. In this case, the predetermined threshold in accordance with each direction may be set so as to differ in correspondence to each motion.

Configuration of Processing Apparatus 20

Figure 3:
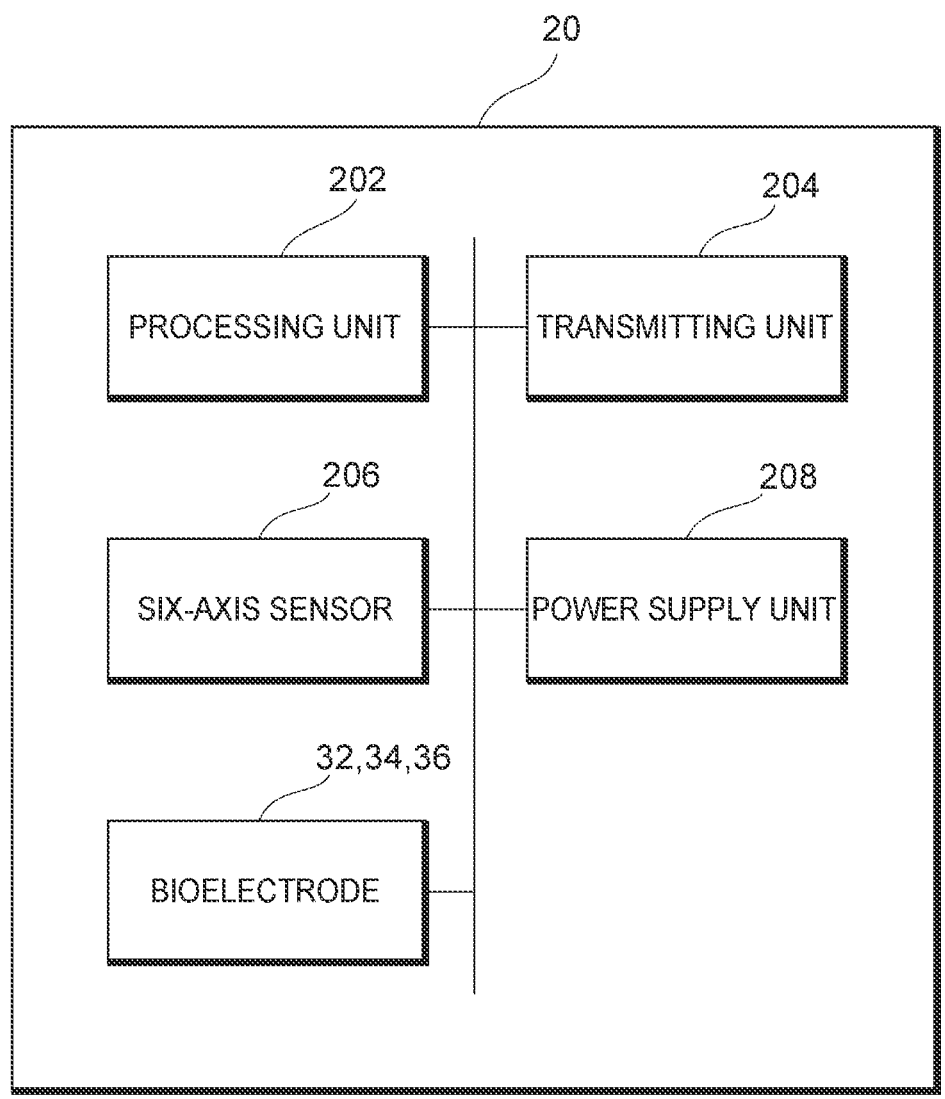
FIG. 3 is a block diagram showing an example of a configuration of a processing apparatus according to the example.

FIG. 3 is a block diagram showing an example of a configuration of the processing apparatus 20 according to the example. As shown in FIG. 3, the processing apparatus 20 includes a processing unit 202, a transmitting unit 204, a six-axis sensor 206, a power supply unit 208, and respective bioelectrodes 32, 34, and 36. In addition, the respective bioelectrodes 32, 34, and 36 are connected to the processing unit 202 using electric wires via an amplifying unit. It should be noted that the respective bioelectrodes 32, 34, and 36 are not necessarily essential components. Furthermore, the processing apparatus 20 has a memory for storing processed data.

The six-axis sensor 206 is a three-axis acceleration sensor and a three-axis angular velocity sensor. Each sensor may be separately provided or either one of the sensors may be provided. The six-axis sensor 206 outputs a detected sensor signal to the processing unit 202.

The processing unit 202 processes the sensor signal obtained from the six-axis sensor 206 or, when necessary, an ocular potential signal obtained from the respective bioelectrodes 32, 34, and 36 and, for example, packetizes the sensor signal or the ocular potential signal and outputs the packet to the transmitting unit 204. In addition, the processing unit 202 may include a processor and, for example, the processing unit 202 may calculate second movement speed data related to a movement speed of a line of sight using the ocular potential signal.

Furthermore, the processing unit 202 may adopt the sensor signal from the six-axis sensor 206 as first movement speed data related to a motion of the head. Information related to a motion of the head is, for example, information related to an upward, downward, leftward, or rightward motion of the head. Alternatively, the processing unit 202 may only amplify the sensor signal obtained from the six-axis sensor 206 or the like.

For example, the transmitting unit 204 transmits the first movement speed data or the second movement speed data having been packetized by the processing unit 202 to the information processing apparatus 10. For example, the transmitting unit 204 transmits the first movement speed data or the second movement speed data to the information processing apparatus 10 by wireless communication such as Bluetooth (registered trademark) or a wireless LAN or by wired communication. The power supply unit 208 supplies power to the processing unit 202, the transmitting unit 204, the six-axis sensor 206, and the like.

In addition, the processing unit 202 may include functions of the CPU 110 shown in FIG. 2. For example, the processing unit 202 includes the acquiring unit 112, the determining unit 113, and the processing control unit 114. In this case, the processing unit 202 acquires the sensor signal (the first movement speed data) acquired from the six-axis sensor 206, determines whether or not the first movement speed data is equal to or higher than the predetermined threshold, and controls execution of the first processing or the second processing in accordance with a determination result. The control in this case involves issuing a command that instructs the processing to be executed.

The transmitting unit 204 transmits the command issued by the processing unit 202 to the information processing apparatus 10. When the processing control unit 114 of the information processing apparatus 10 acquires the command transmitted by the transmitting unit 204 of the processing apparatus 20, the processing control unit 114 executes processing in accordance with the command. Accordingly, a command of processing in accordance with a motion of the user can be issued by the processing apparatus 20 and, since the information processing apparatus 10 need only execute processing in accordance with the command, the command can be readily applied to an existing information processing apparatus 10.

Example of Data

FIG. 4 is a diagram showing an example of data related to a movement speed according to the example. The data shown in FIG. 4 represents data acquired at a predetermined sampling rate (for example, 20 Hz=0.05 seconds). In the example shown in FIG. 4, if 0.05 seconds is set at a determination time point (a point in time determined by the determining unit 113) 60 as the first predetermined amount of time, data d_59 at a determination time point 59 preceding the determination time point 60 is used to execute the first processing, but if 0.2 seconds is set as the first predetermined amount of time, data d_56 at a determination time point 56 that is four determination time points before the determination time point 60 is used to execute the first processing. As data related to a movement speed, data (second movement speed data) related to a movement speed of a line of sight based on an ocular potential signal may also be stored.

Specific Example

Figure 5:
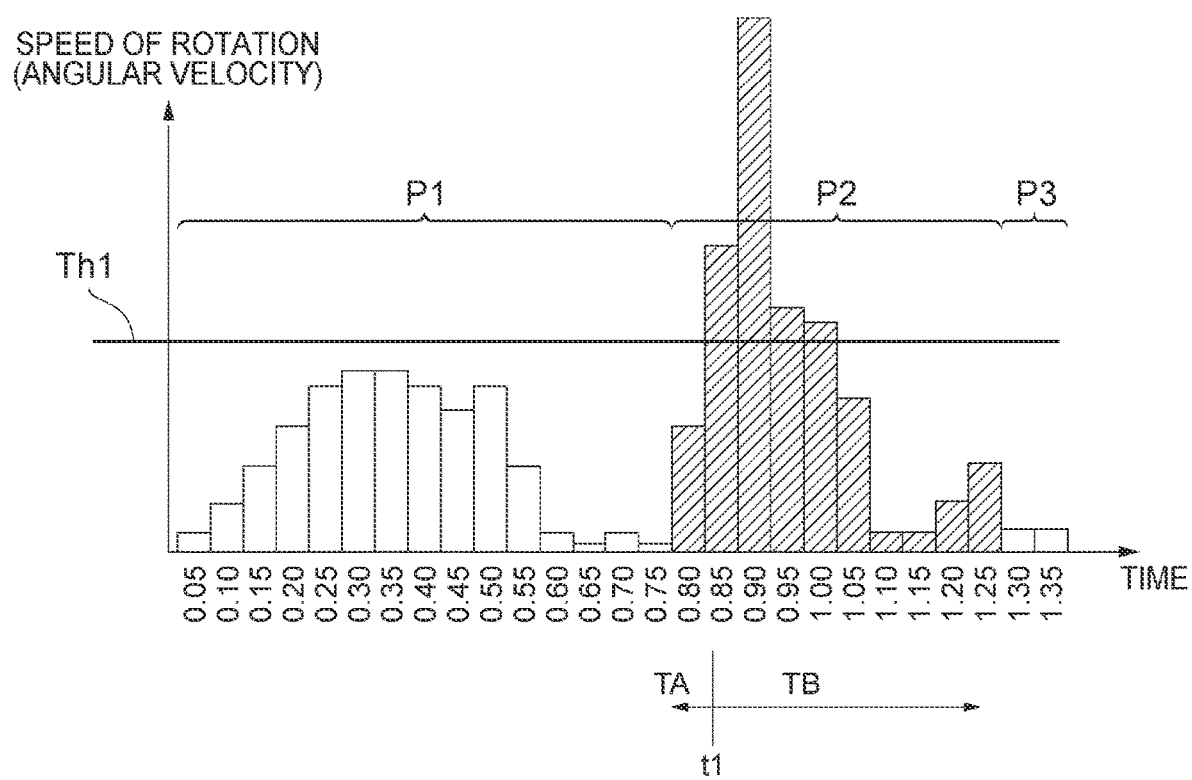
FIG. 5 is a diagram showing a specific example of data used in processing control according to the example.

FIG. 5 is a diagram showing a specific example of data used in processing control according to the example. The example shown in FIG. 5 assumes that the predetermined threshold is Th1, the sampling rate is set to 0.05 seconds, the first predetermined amount of time is set to TA (0.05 seconds) and the second predetermined amount of time is set to TB (0.4 seconds), and angular velocity data is used as data related to a movement speed.

In the example shown in FIG. 5, data equals or exceeds the predetermined threshold Th1 at 0.85 seconds (time point t1). In this case, up to 0.85 seconds, the processing control unit 114 controls execution of the first processing using data of the first predetermined amount of time TA (previous data) before the present time point. For example, when the present time point is 0.60 seconds, data at 0.55 seconds is used to control execution of the first processing.

At a time of day t1, when the determining unit 113 determines that the data is equal to or higher than the predetermined threshold, the processing control unit 114 switches from execution of the first processing to execution of the second processing and controls the execution of the second processing instead of controlling the execution of the first processing using previous data at 0.80 seconds. In other words, the data used for the execution of the first processing corresponds to a period P1 up to 0.75 seconds.

Next, in the example shown in FIG. 5, the determining unit 113 determines whether or not the second predetermined amount of time TB has elapsed from the determination time point t1. In other words, the determining unit 113 determines whether or not 1.25 seconds obtained by adding 0.4 seconds that is the second predetermined amount of time TB to 0.85 seconds that is the determination time point t1 has elapsed. Data corresponding to a period P2 from 0.85 seconds to 1.25 seconds is not used in the first processing.

Next, when the determining unit 113 determines that the second predetermined amount of time has elapsed from the threshold-exceeded determination time point, based on a determination result thereof, the processing control unit 114 restarts control of the execution of the first processing using data of a period P3 subsequent to 1.25 seconds.

The example shown in FIG. 5 is an example that is preferably applied when the first processing is movement processing of a mouse cursor and the second processing is click processing. In addition, when the second processing is drag processing, for example, data of the period P2 is used for start processing of the drag and data of the period P3 is used for movement processing of the drag.

FIG. 6 is a diagram showing a relationship among a determination time point, processing to be executed, and a time point of data used of a specific example in the example. The example shown in FIG. 6 indicates, with respect to the data shown in FIG. 5, which processing is executed at which time point using which piece of data when the first processing is movement processing of a mouse cursor and the second processing is click processing.

As shown in FIG. 6, the first processing is executed until the determination time point 0.85 at which data equals or exceeds the predetermined threshold, and data preceding by the first predetermined amount of time (in this case, previous data) is used in the first processing.

The second processing is executed at the determination time point 0.85. In this case, since the second processing is click processing, the determination result indicating that data has become equal to or higher than the predetermined threshold and position information at the time point thereof are used. Neither piece of data is used for the first processing.

Since the second predetermined amount of time elapses at the determination time point 1.25, processing is not executed and data is not used up to the determination time point 1.25. At or after the determination time point 1.30, the first processing is executed and data preceding by the first predetermined amount of time (in this case, previous data) is used in the first processing.

Operation

Figure 7:
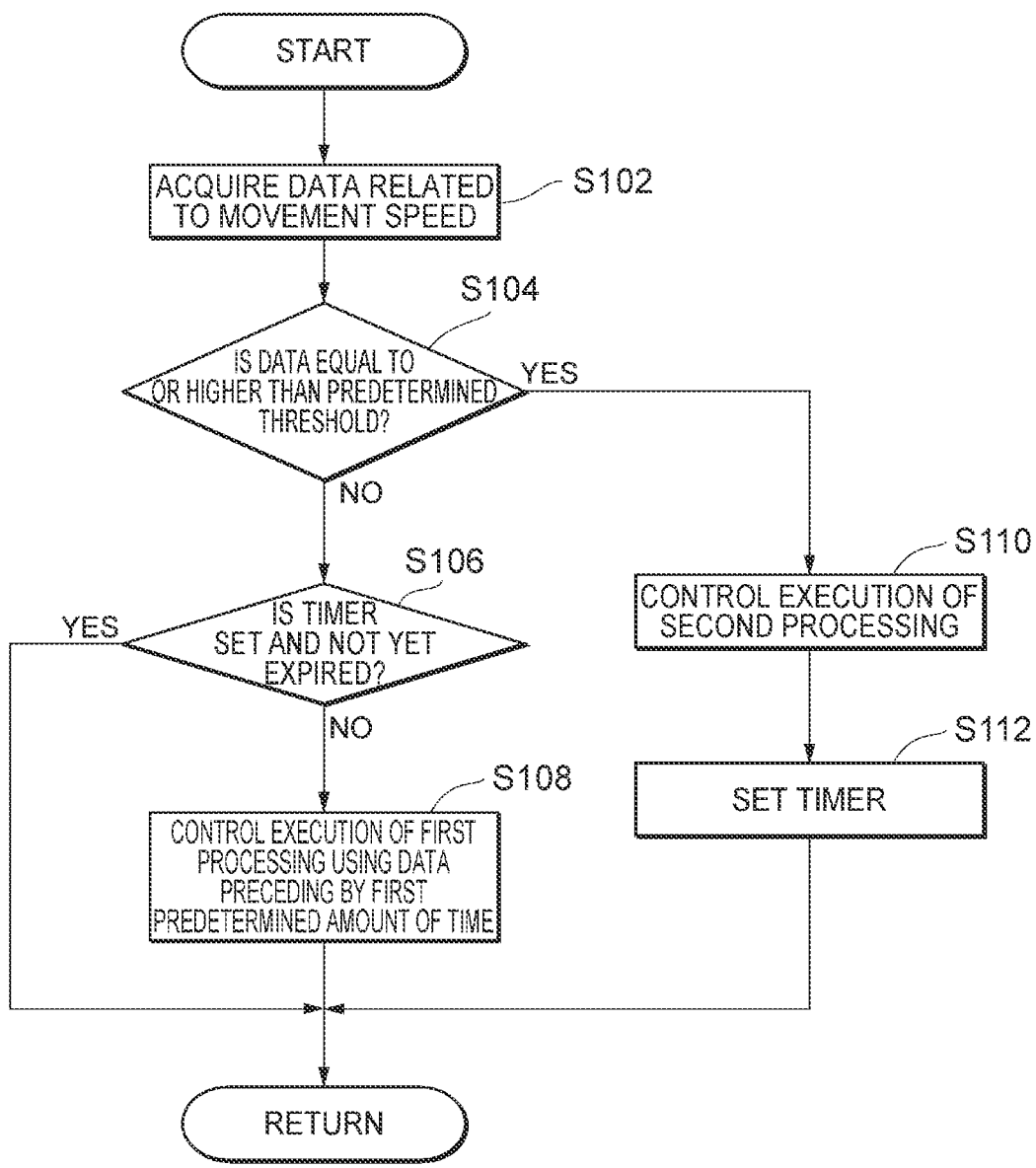
FIG. 7 is a flow chart showing an example of processing related to processing control according to the example.

FIG. 7 is a flow chart showing an example of processing related to processing control according to the example. The processing shown in FIG. 7 is an example of processing to be executed in either the information processing apparatus 10 or the processing apparatus 20.

In step S102 shown in FIG. 7, the acquiring unit 112 sequentially acquires data related to a movement speed of a predetermined part of the user from a sensor mounted to the predetermined part. The predetermined part is, for example, the head of the user, and the data related to a movement speed is, for example, angular velocity data.

In step S104, the determining unit 113 determines whether or not the data related to a movement speed is equal to or higher than a predetermined threshold. When the data is equal to or higher than the predetermined threshold (step S104—YES), the processing advances to step S110, but when the data is lower than the predetermined threshold (step S104—NO), the processing advances to step S106.

In step S106, the determining unit 113 determines whether or not a timer related to the second predetermined amount of time has been set and the timer is not yet expired. When the timer is not yet expired (step S106—YES), data related to a movement speed is not used and a next piece of data is acquired (a return is made to step S102), but when a timer has not been set or the timer has expired (step S106—NO), the processing advances to step S108.

In step S108, the processing control unit 114 controls execution of the first processing by using data preceding, by the first predetermined amount of time, a time point where the determination is made that the data is lower than the predetermined threshold. Subsequently, the processing returns to step S102.

In step S110, when the determining unit 113 determines that the data is equal to or higher than the predetermined threshold, the processing control unit 114 controls execution of the second processing that differs from the first processing.

In step S112, the processing control unit 114 sets a timer related to the second predetermined amount of time. At this point, the timer is set to a predetermined amount of time. Subsequently, the processing returns to step S102. Therefore, data lower than the predetermined threshold is prohibited from being used within the second predetermined amount of time while data equal to or higher than the predetermined threshold can be used a plurality of times within the second predetermined amount of time and, for example, a double-click can be executed in a state where the pointer is stationary within the second predetermined amount of time.

When the processing shown in FIG. 7 is executed by the processing unit 202 of the processing apparatus 20, control of the processing may include issuing a command for instructing execution of the processing, and when the processing shown in FIG. 7 is executed by the CPU 110 of the information processing apparatus 10, control of the processing may include issuing a command for instructing execution of the processing and executing the processing based on the command.

It should be noted that the respective processing steps included in the flow of processing described with reference to FIG. 7 can be executed by arbitrarily changing an order of the processing steps or in parallel to each other and other steps may be added between the respective processing steps as long as no contradictions arise in the contents of the processing. In addition, a step described as a single step for the sake of convenience can be executed by dividing the step into a plurality of steps and, on the other hand, those described as a plurality of steps for the sake of convenience can be comprehended as a single step.

As described above, according to the example, at least two different types of processing can be appropriately separated using a motion of a predetermined part provided with a sensor. For example, the disclosed technique functions in a preferable manner when the first processing is accompanied by movement processing in accordance with a motion of the predetermined part.

In addition, while a motion of the head or an arm or leg of a user has been cited as an example of a motion of the predetermined part in the example described above, a motion of a line of sight of an eye may be used instead. In this case, a motion of an eye may be obtained from a sensor signal detected from each bioelectrode (an example of a sensor) and the processing control unit 114 may control processing based on data (the second movement speed data described above) related to the motion.

While the example is explained using a sensor signal from a six-axis sensor mounted to the eyewear 30, as described above, the six-axis sensor is not limited to being mounted to the head and need only be mounted at any position of the human body.

Furthermore, while it is described in the example that data of a three-axis acceleration sensor may be used as movement speed data, in this case, after acceleration is detected, the acceleration may be converted into speed by predetermined arithmetic processing and data of the speed after the conversion may be used.

While the present invention has been described using an example, the technical scope of the present invention is not limited to the range described in the above example. It will be understood by those skilled in the art that various modifications or improvements can be made to the example described above. It will also be understood from the scope of claims that modes incorporating such modifications or improvements may also be included in the technical scope of the present invention.

What is claimed is:

1. An information processing method to be executed by a processor included in an information processing apparatus, the information processing method comprising:
    sequentially acquiring data relating to a movement speed of a predetermined part of a user at a plurality of time points from a sensor mounted on the predetermined part;
    determining whether or not the acquired data is equal to or higher than a predetermined threshold;
    controlling execution of first processing by using the acquired data that is determined to be lower than the predetermined threshold, the acquired data being acquired before a time point, the time point being a first predetermined amount of time before the acquired data is determined to be equal to or higher than the predetermined threshold; and
    controlling execution of second processing that differs from the first processing by using the acquired data that is determined to be equal to or higher than the predetermined threshold.

2. The information processing method according to claim 1, wherein
    the controlling of execution of the first processing comprises:
    not using the acquired data within a second predetermined amount of time from a time point where the acquired data is determined to be equal to or higher than the predetermined threshold.

3. The information processing method according to claim 2, wherein
    the controlling of execution of the first processing comprises:
    setting a timer on the basis of the time point where the acquired data is determined to be equal to or higher than the predetermined threshold and not using acquired data within the second predetermined amount of time until the timer expires without the subsequent acquired data being determined to be equal to or higher than the predetermined threshold.

4. The information processing method according to claim 2, wherein
    the acquired data relating to the movement speed includes pieces of data relating to movement speeds in a plurality of directions including a first direction,
    the determining comprises:
    determining whether or not the piece of data in the first direction is equal to or higher than the predetermined threshold, and
    the controlling of execution of the first processing includes
    not using the pieces of data in the first direction and other directions within the second predetermined amount of time.

5. The information processing method according to claim 1, wherein
    the controlling of execution of the second processing comprises:
    switching from the execution of the first processing to the execution of the second processing and controlling the execution of the second processing.

6. The information processing method according to claim 1, wherein
    the first processing includes movement processing of a pointer within a screen, and
    the second processing includes click processing or drag processing.

7. A non-transitory recording medium storing a program that causes a processor included in an information processing apparatus to execute to:
    sequentially acquire data relating to a movement speed of a predetermined part of a user from a sensor mounted on the predetermined part;
    determine whether or not the acquired data is equal to or higher than a predetermined threshold;
    control execution of first processing by using the acquired data that is determined to be lower than the predetermined threshold, the acquired data being acquired before a time point, the time point being a first predetermined amount of time before the acquired data is determined to be equal to or higher than the predetermined threshold; and control execution of second processing that differs from the first processing by using the acquired data that is determined to be equal to or higher than the predetermined threshold.

8. An information processing apparatus including a processor, the processor executes to:

sequentially acquire data relating to a movement speed of a predetermined part of a user from a sensor mounted on the predetermined part;

determine whether or not the acquired data is equal to or higher than a predetermined threshold;

control execution of first processing by using the acquired data that is determined to be lower than the predetermined threshold, the acquired data being acquired before a time point, the time point being a first predetermined amount of time before the acquired data is determined to be equal to or higher than the predetermined threshold; and control execution of second processing that differs from the first processing by using the acquired data that is determined to be equal to or higher than the predetermined threshold.

* * * * *